United States Patent [19]

Shaner et al.

[11] Patent Number: 5,445,208
[45] Date of Patent: Aug. 29, 1995

[54] VINYL DOOR PANEL SECTION

[75] Inventors: John F. Shaner, Munroe Falls; Daniel W. Evans, Hudson, both of Ohio

[73] Assignee: Associated Materials, Inc., Akron, Ohio

[21] Appl. No.: 68,067

[22] Filed: May 27, 1993

[51] Int. Cl.$^6$ .............................................. E06B 3/12
[52] U.S. Cl. ..................................... 160/232; 160/236
[58] Field of Search .................. 160/229.1, 201, 232, 160/236; 52/309.4, 309.5, 309.9, 309.14, 809

[56] References Cited

U.S. PATENT DOCUMENTS

| | | | |
|---|---|---|---|
| 3,511,301 | 5/1970 | Graham et al. | 160/232 X |
| 3,583,123 | 6/1971 | Holmgren . | |
| 3,980,123 | 9/1976 | Vago . | |
| 4,119,133 | 10/1978 | Wolf | 160/201 X |
| 4,156,448 | 5/1979 | Bengtsson | 160/201 X |
| 4,284,119 | 8/1981 | Martin et al. | 160/229.1 X |
| 4,339,487 | 7/1982 | Mullet . | |
| 4,539,241 | 9/1985 | Kainulainen et al. . | |
| 4,550,540 | 11/1985 | Thorn . | |
| 4,579,613 | 4/1986 | Belanger . | |
| 4,588,541 | 5/1986 | Fowler . | |
| 4,676,293 | 6/1987 | Hannssen | 160/201 |
| 4,685,266 | 8/1987 | Mullet . | |
| 4,746,383 | 5/1988 | Bacon et al. . | |
| 4,864,789 | 9/1989 | Thorn . | |
| 5,016,700 | 5/1991 | Wegner et al. | 160/201 X |
| 5,060,711 | 10/1991 | Fimbell | 160/229.1 |
| 5,074,087 | 12/1991 | Green . | |
| 5,170,832 | 12/1992 | Wagner | 160/229.1 X |

FOREIGN PATENT DOCUMENTS

1442162 5/1966 France .
2236346 4/1991 United Kingdom .

OTHER PUBLICATIONS

Sales Brochure—Skywood N.C. Extrusion, Inc., "Celuka Insulated Sectional Doors", publication date unknown.
Sales Brochure—CHI Overhead Doors, "Cedar Classic Series", publication date unknown.
Sales Brochure—Amarr, "Amarr Heritage II Residential Steel Doors", Model 900 & Model 910, ©1992.
Sales Brochure—Composite Door Industries, "Impression", publication date unknown.
Sales Brochure—Wayne Dalton Corp., "Thermowayne TM 36", ©1992.
Sales Brochure—Cladwood Garage Door Inserts, ©1990.
Sales Brochure—Anderson Door Company, "The Future of Thermal Door Design", publication date unknown.
Sales Brochure—Taylor, "Taylorcore Embossed TM", ©1989.
Price List—Clopay Garage Doors—Residential Garage Door 1992.
Sales Brochure—Clopay ProSeries, "Clopay 4150/4151", ©1991.
Sales Brochure—Delden, "The Delcor Model SRP1", publication date unknown.
Sales Brochure—Taylor, "Steelpro TM", ©1988.
Sales Brochure—Taylor, "Durasteel TM", ©1989.
Sales Brochure—CHI Overhead Doors, Panel Classic Series, publication date unknown.
Sales Brochure—Taylor, "Encore TM", ©1991.
Sales Brochure—Anozira Door Systems Inc., "Doors of Distinction", ©1989.
Sales Brochure—Taylor, "Northern Lites TM", publication date unknown.

*Primary Examiner*—David M. Purol
*Attorney, Agent, or Firm*—Banner & Allegretti, Ltd.

[57] ABSTRACT

A door panel section and a method of making a door panel section having a polyvinylchloride front skin, a non-metallic rear skin and a polyurethane rigid core. The polyurethane rigid core unitizes the two skins to make the panel section with a rigid lightweight structure. The polyurethane mechanically and chemically bonds to the skins made of polyvinylchloride to create a strong connection thereto. Hardware mounting members are attached to the rear skin permitting adjacent panel sections to be pivotally connected to each other.

14 Claims, 6 Drawing Sheets

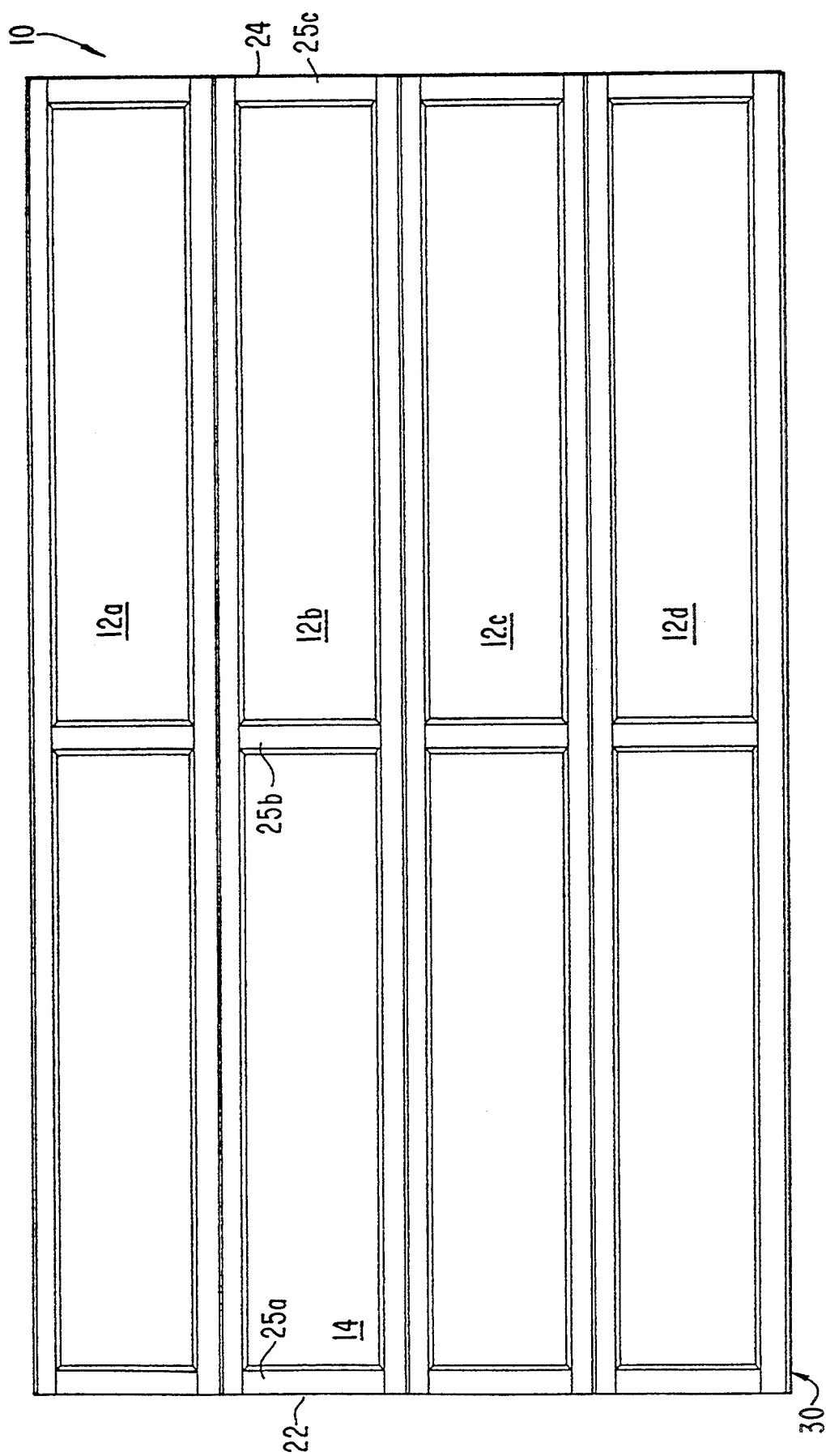

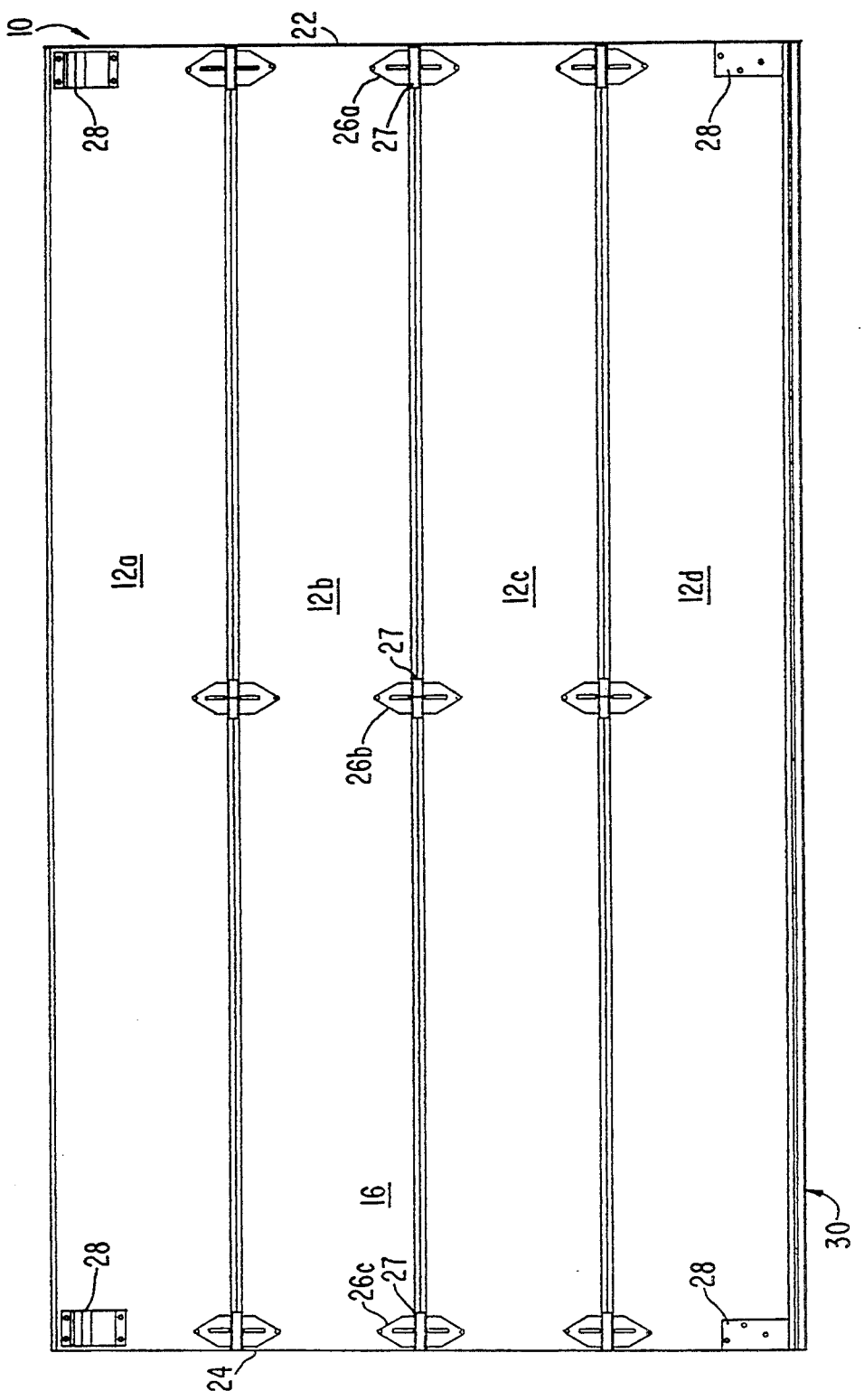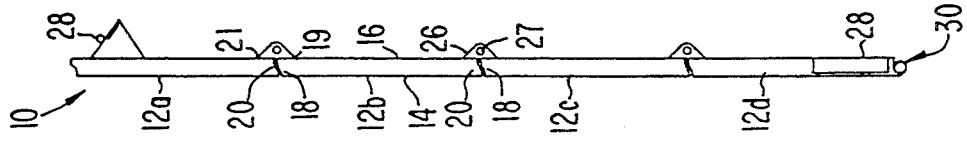

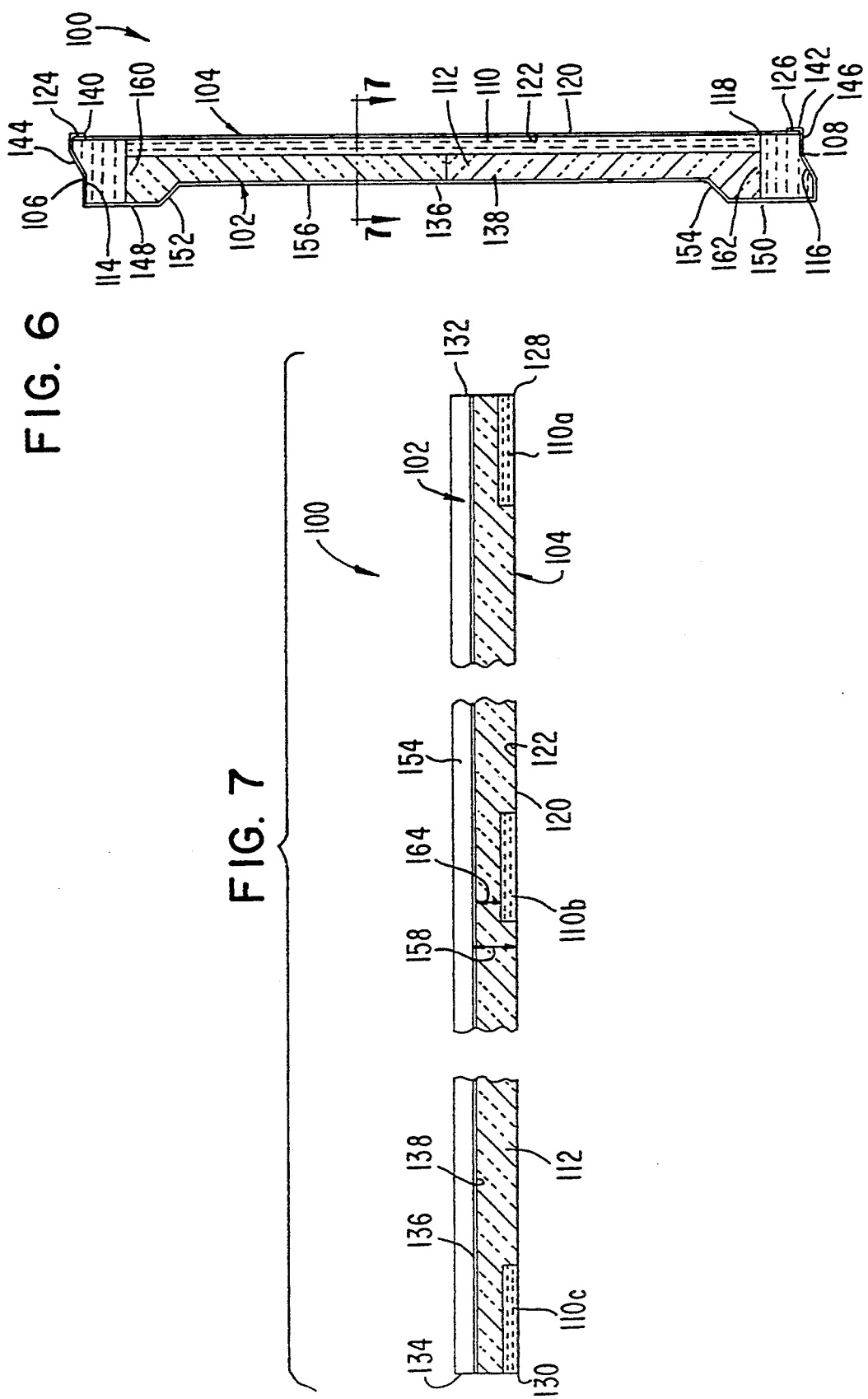

VINYL DOOR PANEL SECTION

FIELD OF INVENTION

The present invention relates to vinyl sectional doors. Particularly, this invention relates to sectional doors in which vertically adjacent panel sections are hinged together to form a sectional door, such as a garage door. Each panel section includes a polyvinylchloride front skin, a non-metallic rear skin and a rigid polyurethane foam center which bonds to the front and rear skins providing structural unity to the panel section.

BACKGROUND OF THE INVENTION

Historically, garage doors evolved from barn doors. Thus, garage doors originally had either two door members which were hinged at the sides of the garage entry opening, or a single door member which could be spring or counterbalance lifted into the ceiling of the garage. As these designs were impractical for many applications, a sectional garage door was the next major innovation in the development of the garage doors.

A sectional door generally consists of a plurality of vertically superimposed panel sections, lace hardware, rollers and two parallel tracks. The panel sections extend the width of the garage entry opening and are typically between 12 to 24 inches in height. Vertically adjacent panel sections are united and controlled by the face hardware which consists primarily of hinges. Each of the two parallel tracks is positioned at a side of the garage entry opening. Rollers are attached to the sides of the panel sections which slide through the track permitting the sectional door to be moved between raised and lowered positions.

The original panel sections for sectional doors were manufactured of wood. From 1940 through 1965 wood sectional doors dominated the marketplace. There are two types of wood panel sections, those of a raised or recessed design and those of a flush design.

A panel section of a raised or recessed design wood door consists of top and bottom rails which are united by vertical members called styles to form a unitized frame. Shaped wood pieces fill the areas inside of the rails and styles to complete the panel section.

A panel section of a flush design wood door consists of a unitized frame made of rails and styles similar to the panel design. A flush sheet of wood or wood composite material is bonded to the front, or to both the front and back of the unitized frame. If wood sheets are mounted to both the front and back of the unitized frame, the center or core of the panel sections defined by the space therebetween, may optionally be filled for additional strength and/or insulation. If filled, either a corrugated honeycomb or expanded polystyrene typically is used as a filler material.

Both designs of wood sectional doors include disadvantages which are inherent to the properties associated with wood. For example, wood has the tendency to split, crack, splinter, rot and warp, because it is sensitive to temperature and humidity changes, water absorption and sunlight. Further, many users find that wood panel sections do not provide sufficient impact resistance, wind resistance or thermal insulation properties. Wood panel sections are also typically heavier than many other types of panel sections, creating more stress on the connecting hardware, making it more difficult to manually raise and lower the garage door, and costing more money to raise and lower the garage door by an electrical opener. Additionally, wood panel sections frequently require continuous painting or staining to maintain their desired appearance.

The next technological advancement was the advent of the steel sectional door. Steel sectional doors started to dramatically replace the wood market with near domination in the current marketplace.

A steel door panel section consists primarily of a single sheet member having a vertical portion and generally horizontal top and bottom portions. A panel section is manufactured by roll forming a sheet of precoated steel coil stock. The roll forming process bends the sheet to form the top and bottom portions of the section in order to achieve the proper interface between vertically adjacent panel sections. Raised panels are stamped into the vertical portion of the sheet to increase panel section stiffness, resist oil canning, and provide an aesthetically pleasing design.

A steel commercial door panel section generally consists of a heavier gauge steel and is manufactured by roll forming not only the top and bottom portions but also horizontal fibs. These ribs are used in lieu of the stamped panels to achieve stiffness and resistance to oil-canning. The roll formed ribs reduce the cost of the panel section by eliminating the stamping process.

Advancements to steel doors have been minimal and have been centered around increases in thermal effectiveness and additional panel section strength. In one advancement, a block of expanded polystyrene is dropped into a hollow back side of the panel section, which is defined by the area behind the vertical front portion and in between the top and bottom portions, to insulate the steel panel section. In another improved design, a rear steel skin is introduced to sandwich the block of polystyrene. In yet another improved steel panel section design, individual front and back steel skins are roll formed and a polyurethane foam is poured or injected therebetween. The polyurethane foam expands to structurally enhance and increase the thermal efficiency of the panel section. Additionally, there have been thermal efficiency improvements in the panel sections themselves, between vertically adjacent panel sections, and in seals around the door.

However, steel sectional doors have some disadvantages which are inherent to the properties associated with steel. For example, steel has the tendency to rust, erode and deteriorate because it is sensitive to humidity changes and water exposure. Steel panel sections are also susceptible to denting upon a relatively small force applied thereto. Steel panel sections tend to be heavier than some other types of panel sections creating more stress on the connecting hardware, making it more difficult to install and manually raise and lower the garage door, and costing more money to raise and lower the door by an electrical opener. Further, the insulation properties of even insulated steel panel sections may not be adequate for some applications. Additionally, steel panel sections usually require continuous painting due to its propensity for color fading and scratching.

In addition to the wood and steel sectional garage doors, specialty sectional garage doors have been introduced which make use of aluminum, plastic, and/or fiberglass.

A garage panel section utilizing an aluminum frame and a plurality of blow-molded polyethylene panels is disclosed in U.S. Pat. No. 3,980,123 to Vago. The aluminum frame consists of horizontal support rails and vertical styles spaced approximately 3-4 feet apart. The polyethylene panels are placed inside the aluminum frame and are sized to fit vertically between adjacent rails and fit horizontally between adjacent styles. The prior art also includes a similar garage door panel section design with an aluminum frame and polyethylene panels which are twin-sheet vacuum formed as opposed to blow-molded.

While this panel section design with an aluminum frame and polyethylene panel sectional door includes improvements over the steel and wood garage doors, there are still drawbacks in the design. First, the aluminum frames are subject to corrosion. Second, the panel sections may not be structurally strong or wind resistant enough for many applications. Third, the price of these sections may be too expensive for many purchasers due to the cost of the aluminum frame and the cost of assembling the sections. Fourth, its thermal insulation properties may not be adequate for some applications. Additionally, polyethylene has a chemical make-up which is less stable than some other plastics which increases the possibility of color fading.

Fiberglass sectional garage doors have also been introduced into the marketplace. Fiberglass panel sections are similar in design to the steel panel sections with the primary difference being the material of the skins. A major advantage associated with these panel sections is that fiberglass skins will not dent or rust like steel skins. However, fiberglass skins are susceptible to cracking from temperature changes and forces applied thereto. Further, foamed-in-place polyurethane cores which may be used in the fiberglass panel sections only mechanically bond with the fiberglass skins, and thus do not strengthen or control the thermal expansion properties of the fiberglass skins to the same degree as foam cores which chemically and mechanically bond to the skins.

A sectional garage door with panel sections having a corrugated steel rear skin strip and a polyvinylchloride front skin is disclosed in U.S. Pat. No. 4,339,487, to Mullet. Vertically oriented wood styles are inserted into steel rear strip to form flush ends for the sections. A vinyl film strip forms the front skin and includes a wetted polyurethane foam sprayed thereon. The vinyl film strip is applied over steel rear strip and the panel section is heated to expand the polyurethane foam. The expanded foam core serves the functions of a bonding agent and a thermal insulator. While this configuration improves upon the all-steel door designs, it still has many of the same problems associated therewith.

A sectional garage door made from steel reinforced, extruded polyvinylchloride panel sections has also been introduced by Skywood Extrusion Incorporated which is located in Canada. Each panel section includes two extruded polyvinylchloride elements which are fixedly joined together by a continuous roll-formed steel strut. Each extruded element includes a front skin surface and a rear skin surface which are joined together by top and bottom walls and two internal reinforcing fibs. The two internal reinforcing ribs provide important structural support for each extrusion and divide the space between the front and rear surfaces and the top and bottom walls into three vertically spaced internal sections. The three internal sections in each extrusion may be filled with polystyrene, isocyanurate foam, or foamed-in-place polyurethane as an insulator. Steel end caps are placed over each end section to provide structural support between the joined extrusions.

While this design utilizes some of the advantages associated with extruded polyvinylchloride, the design also includes disadvantages. First, the steel end caps and roll-formed steel struts which extend the width of the garage entry opening significantly increase the weight of the door and have disadvantages associated with steel doors, e.g., rusting and denting. Additionally, the two internal reinforcing ribs in each extrusion requires a larger quantity of polyvinylchloride which increases the cost of the panel sections. Further, the extrusions are not easily adaptable to provide an aesthetically pleasing look having raised or recessed panels.

SUMMARY OF THE INVENTION

In view of the foregoing, it is a principal object of the present invention to provide a sectional door which overcomes the aforementioned drawbacks of the prior art.

More specifically, it is an object of the invention to provide a panel section for a garage door which provides cost economies, structural integrity and excellent thermal insulation properties.

Another object is to provide a panel section which is lightweight and easy to assemble.

It is yet another object of the invention to provide a panel section having a strong chemical bond between a polyvinylchloride front skin and a polyurethane rigid foam core uniting the panel section to provide structural and thermal improvements and to control the expansion properties of the polyvinylchloride front skin.

A still further object of the invention is to provide a panel section for a garage door having a vinyl skin which is chemically and mechanically bonded to a polyurethane core so that the panel section will not warp or crack like wood, dent or rust like steel, or crack or split like fiberglass.

It is an additional object of the present invention to provide a panel section which is structurally strong, thermally efficient, aesthetically pleasing and which does not require frequent maintenance, e.g., painting or staining.

Another object of the invention is to provide a panel section with extruded front and rear skins such that modifications to the shape of the panel section can easily be made without incurring extensive costs which are associated with producing a new mold for injection molding.

These and other objects are achieved by the present invention which, according to one aspect, provides a rectangular door panel section which has a front skin, a rear skin, opposing top and bottom portions, and first and second sides. The door panel section includes a first sheet member, a second sheet member and a rigid foamed core. The first sheet member is made from a polyvinylchloride material and has outer and inner surfaces, and top and bottom sections. The second sheet member is made from a non-metallic material and has outer and inner surfaces, and top and bottom sections. The front skin of the panel section is comprised essentially of the first sheet member and the rear skin of the panel section is comprised essentially of the second sheet member. The sheet members are oriented such that the inner surface of the first sheet member faces the inner surface of said second sheet member. The rigid foamed core is bonded to the inner surface of said first sheet member and is enclosed between the front and rear skins for unitizing the panel section. The core extends continuously from the top portion of the panel section to the bottom portion of the panel section.

In a second aspect, the invention provides a garage door comprised of a plurality of pivotally attached panel sections. Each panel section has a front skin, a rear skin, opposing top and bottom portions, and first and second sides. Each panel section includes a first sheet member, a second sheet member and a rigid foamed core. The first sheet member is of each panel section made from a polyvinylchloride material and has outer and inner surfaces, and top and bottom sections. The second sheet member of each panel section is made from a nonmetallic material and has outer and inner surfaces, and top and bottom sections. The front skin of each panel section is comprised essentially of the first sheet member and the rear skin of each panel section is comprised essentially of the second sheet member. The sheet members of each panel section are oriented such that the inner surface of the first sheet member faces the inner surface of said second sheet member. The rigid foamed core in each panel section is bonded to the inner surface of said first sheet member and is enclosed between the front and rear skins for unitizing the panel section. The core extends continuously from the top portion of the panel section to the bottom portion of the panel section.

In another aspect, the invention provides a method of forming a door panel section. The method includes the steps of extruding a first sheet member in sheet form from a vinyl material and shaping the first sheet member to achieve a desired shape which has an inner surface. A second sheet member having an inner surface is formed from a non-metallic material. An upper horizontal rail, an lower horizontal rail, and a plurality of hardware mounting members are provided, and each of the plurality of hardware mounting members are attached to both the upper and lower horizontal rails to form a joined framework. The joined framework is affixed to the inner surface of the second sheet member. One of the first and second sheet member is placed around the other one of the first and second sheet member to form a cavity between the first and second sheet members which is vertically continuous between the upper and lower horizontal rails. A filler material is injected into the cavity and is permitted to expand and cure, forming a rigid foam core which completely fills the cavity.

In yet another aspect, the invention provides a method of extruding and shaping both the first and second sheet members from a vinyl material. A plurality of hardware mounting members is provided and subsequently affixed to the inner surface of the second sheet member. One of the first and second sheet member is placed around the other one of the first and second sheet member to form a top wall, a bottom wall, and a cavity between the first and second sheet members which is vertically continuous from the top wall to the bottom wall. A filler material is injected into the cavity and is permitted to expand and cure, forming a rigid foam core which completely fills the cavity.

These and other objects and features of the invention will be apparent upon consideration of the following detailed description of preferred embodiments thereof, presented in connection with the following drawings in which like reference numerals identify like elements throughout.

BRIEF DESCRIPTION OF THE DRAWINGS

FIG. 1 is a front (a.k.a. exterior) view of the sectional garage door of the present invention;

FIG. 2 is a rear (a.k.a. interior) view of the sectional garage door of FIG. 1;

FIG. 3 is a side view of the sectional garage door of FIG. 1;

FIG. 6 is a side view of the first preferred embodiment of a panel section;

FIG. 7 is a cross-sectional view taken along lines 7—7 of FIG. 6;

DETAILED DESCRIPTION OF THE PREFERRED EMBODIMENT

Figure 5:
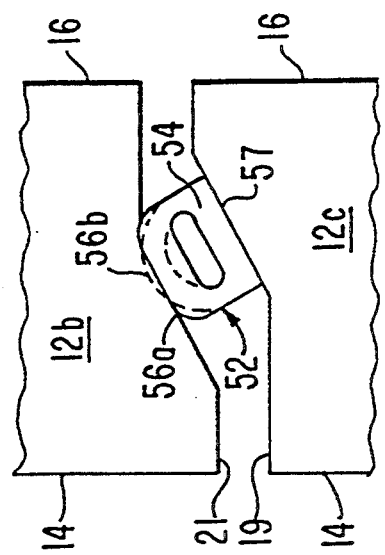
FIG. 5 is a detailed side view of the interface between vertically adjacent panel sections.

The sectional garage door of the present invention is shown generally in FIGS. 1-3, and is designated by reference numeral 10. Garage door 10 includes a plurality of vertically adjacent panel sections 12a, 12b, 12c, and 12d. The height of garage door 10 is determined by the number of panel sections 12 used and should be equivalent to the height of the garage entry opening. The width of panel sections 12 should be equivalent to the width of the garage entry opening, such that the height and width of garage door 10 is equivalent to the height and width of garage entry opening.

Panel sections 12 include a front skin 14, a rear skin 16, opposing top and bottom portions 18, 20 having top and bottom walls 19, 21, respectively, and opposing left and right sides 22, 24. Front skin 14 of panel section 12 includes exterior vertical insert members 25 and is installed to face the exterior of the garage, while rear skin 16 of panel section 12 is installed to face the interior of the garage. The specifics of panel sections 12 are described hereinafter in conjunction with the first and second preferred embodiments of panel sections which are shown in FIGS. 6-8 and FIGS. 10-11, respectively.

Adjacent panel sections 12 are pivotally attached to each other by hinge assemblies 26a, 26b, 26c having hinges 27. The number of hinge assemblies 26 used between each adjacent panel sections 12 preferably varies in proportion to the width of panel sections 12. For example, panel sections that are 8-10 feet wide preferably include three equally spaced hinge assemblies, as shown in FIG. 2. Panel sections which are 12 feet wide preferably have four equally spaced hinge assemblies. Panel sections which are 16-18 feet wide preferably include five equally spaced hinge assemblies, and panel sections which are 20 feet wide preferably include six equally spaced hinge assemblies. However, the number and spacing of the hinge assemblies 26 is not critical, as it is recognized that any number of hinge assemblies 26 may be used.

Rollers, not shown, are attached to the sides of panel sections 12. The rollers travel in tracks which are mounted at the sides of the garage entry opening. While the rollers and the hinge assemblies 26 may each be attached separately to panel sections 12, it is preferable to mount a hinge assembly 26a, 26c adjacent each side 22, 24 which has provisions thereon for the attachment of a roller.

Interfacing brackets 28 are attached adjacent the four corners of garage door 10 for the attachment of cables thereto for raising and lowering garage door 10 and providing a proper interface with the tracks. The hinge assemblies 26, rollers, interfacing brackets 28 and tracks are conventional and well known and will not be explained further herein.

As is apparent from FIG. 2, the rear exteriors of panel sections 12 and garage door 10, include hinge assemblies 26 and interfacing brackets 28 attached thereto. Further, the rear exteriors of panel sections 12 and garage door 10 are void of exterior reinforcing stiles, as is also evident from FIG. 2.

Figure 4:
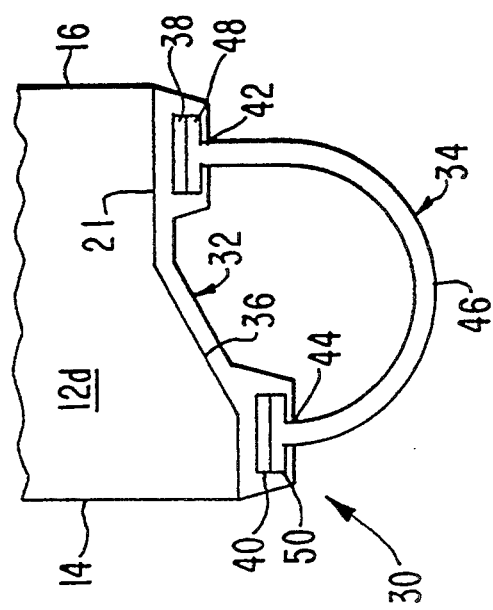
FIG. 4 is a detailed side view of the gasket assembly.

On each garage door 10, bottom panel section 12d has a gasket assembly 30 attached to the bottom thereof. Gasket assembly 30 conforms to the ground or floor surface and helps seal out the elements from the interior of the garage. Details of gasket assembly 30 are shown in FIG. 4.

Gasket assembly 30 includes a gasket retainer 32 and a gasket 34. Gasket retainer 32 is attached to lowermost panel section 12d and has a contoured upper surface 36 to mate with bottom wall 21 of panel section 12d. Gasket retainer 32 includes an upper or interior holding channel 38 and a lower or exterior holding channel 40. Each holding channel 38, 40 includes a slot 42, 44 in the bottom thereof permitting the insertion of gasket 34. Gasket retainer 32 may be affixed to bottom wall 21 of panel section 12d by any suitable device including, but not limited to, adhesives, screws or nails.

Gasket 34 is made from a silicon or rubber composition and includes an arcuate compressible portion 46 which terminates at each end by horizontal flanges 48, 50. The flanges 48, 50 reside in respective holding channels 38, 40 such that gasket 34 is held in place by gasket retainer 32.

When garage door 10 is in a lowered position, arcuate compressible portion 46 of gasket 34 is compressed against the ground or garage floor surface by the weight of garage door 10 to create an air and waterproof seal between the bottom of garage door 10 and the ground or garage floor surface. Upon garage door 10 being raised slightly from the lowered position, the weight of garage door 10 no longer compresses arcuate portion 46 of gasket 34, and arcuate portion 46 will return to its relaxed state as shown in FIG. 4.

FIG. 5 shows a detailed view of the interface between vertically adjacent panel sections, e.g., 12b, 12c. To create a sealed interface, a D-shaped silicone seal strip 52 extends across the entire width of panel sections 12 and includes a planar section 54 and a compressible arcuate section 56. Planar section 54 has an adhesive bottom layer 57 which is protected before attachment by a peel-away cover strip. The adhesive bottom layer 57 of planar section 54 is attached to top wall 19 of a lower interfacing panel section 12c.

When garage door 10 is in a closed position, bottom wall 21 of upper adjacent panel section 12b contacts arcuate section 56 and the weight of upper interfacing panel section 12b compresses arcuate section 56 into a compressed state 56a. This compression creates a seal between vertical adjacent panel sections 12b, 12c to prevent water and air infiltration. When garage door 10 is being moved between the raised and lowered positions, adjacent panel sections 12b, 12c will reach a curved portion along the tracks where the adjacent panel sections 12b, 12c pivotally move away from each other. Upon this pivotal motion, panel section 12b will separate from seal strip 52 and arcuate section 56 will move to a relaxed state 56b until continued motion of garage door 10 causes panel section 12b to recompress arcuate section 56.

Although the interface is shown with reference to adjacent panel sections 12b and 12c, it should be recognized that the same interface exists between all adjacent panel sections 12. Additionally, although, seal strip 52 is shown as being attached to top wall 19 of lower adjacent panel section 12c, it is recognized that seal strip 52 could be attached to bottom wall 21 of upper adjacent panel section 12b to create the seal.

Figure 8:
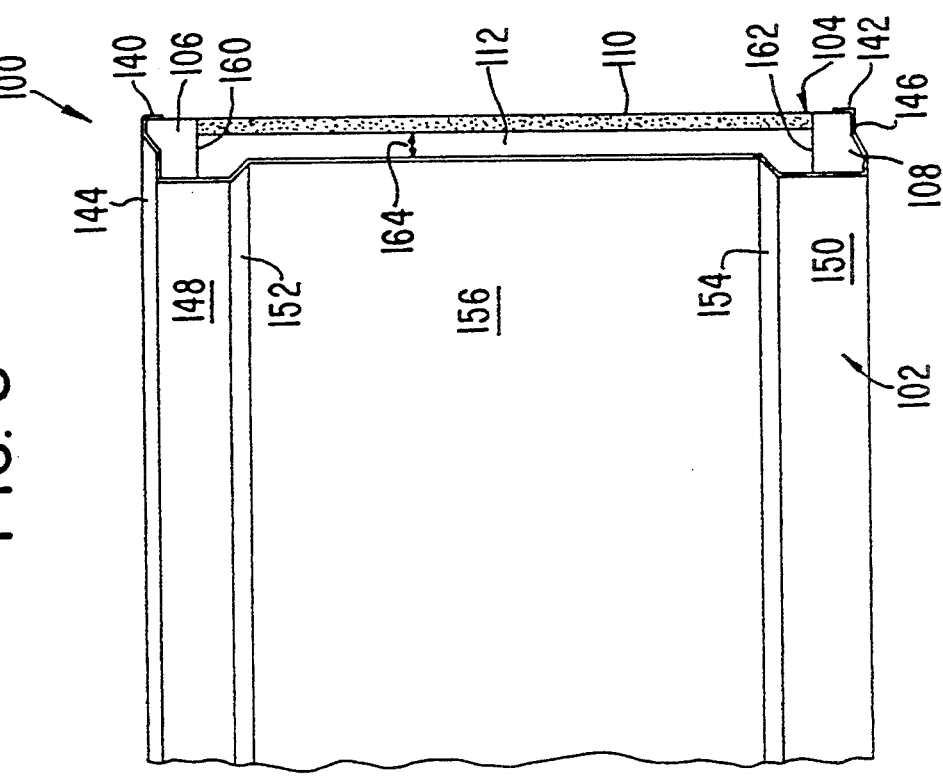
FIG. 8 is an isometric view of the right side of a panel section of FIG. 6.

FIGS. 6–8 show the panel section of the first preferred embodiment which is generally referred to by reference numeral 100. Panel section 100 includes front and rear sheet members 102, 104, upper and lower rails 106, 108, a plurality of hardware mounting members 110a, 110b, 110c and a rigid foamed core 112.

Upper and lower rails 106, 108 are substantially horizontally orientated and vertically spaced to occupy top and bottom portions 18, 20 of panel section 100. A top surface 114 on each upper rail 106 and a bottom surface 116 on each lower rail 108 have a ship lap configuration to facilitate the seal between adjacent panel sections 100 as previously described.

Vertical hardware mounting members 110a, 110b, 110c are connected to upper and lower rails 106, 108 to form a joined framework 118. Each hardware mounting member 110 also performs the function of providing a load bearing surface for the mounting of hinge assemblies 26, rollers and brackets 28. The number and location of hardware mounting members 110 in each panel section 100 is preferably the same as the number and location of horizontally spaced hinge assemblies 26 mounted to panel section 100.

For example, assume panel section 100 shown in FIG. 7 is 8 feet wide. As previously described, an 8 foot panel section 100 preferably includes three equally spaced hinge assemblies 26. Two of these hinge assemblies 26 are preferably located at the sides of panel section 100 and include provisions for the attachment of a roller thereon. Therefore, the 8 foot panel section 100 would preferably include three hardware mounting members 110, one centrally located 110b and one at each side 110a, 110c.

Rails 106, 108 and hardware mounting members 110 are preferably made of wood and affixed to each other by zigzag staples, not shown. However, it should be recognized that rails 106, 108 and hardware mounting members 110 could be made from other materials, including aluminum or other metals, or polyvinylchloride or other plastics, so long as they adequately perform the previously described functions associated therewith. Also, other methods of attachment could be used, including adhesives, nails, tacks, etc., as long as they provide sufficient strength to retain hardware mounting members 110 and rails 106, 108 together. Further, although the interface between each hardware mounting member 110 and rails 106, 108 is a flush abutting surface, other interfacing arrangements including stepped surfaces and dovetail joints could be used.

Rear sheet member 104 is preferably a planar, fiber reinforced polyester material, more commonly known as a form of fiberglass. Rear sheet member 104 forms rear skin 16 of panel section 100 and includes outer and inner surfaces 120, 122, top and bottom segments 124, 126, and left and right side edges 128, 130. Inner surface 122 of rear sheet member 104 is attached to back side of the joined framework 118 of rails 106, 108 and hardware mounting members 110, preferably by an adhesive. Although rear sheet member 104 is preferably made from a fiber reinforced polyester, other non-metallic materials, e.g., plastics, could also be used. If rear sheet member 104 is made from the preferred fiberglass material, the preferred method of manufacturing is injection-molding. However, if rear sheet member 104 is made from another plastic material, e.g., polyvinylchloride, other well known methods of manufacturing including extrusion molding may be used.

Front sheet member 102 is preferably an extruded polyvinylchloride sheet which is post processed through calibrators to achieve the cross-sectional shape as best shown in FIGS. 6 and 8. Front sheet member 102 is shaped to extend around the front side of joined framework 118 to form front skin 14 of panel section 100. Front sheet member includes left and right side edges 132, 134 and outer and inner surfaces 136, 138, and is oriented such the inner surface 138 faces inner surface of rear sheet member 122. The preferred chemical formula for the polyvinylchloride front sheet member 102, which provides an effective bond to foam core 112 is described in detail hereinafter.

As best shown in FIG. 8, front sheet member 102 further includes top and bottom overlap segments 140, 142, top and bottom ship lap segments 144, 146, upper and lower outer planar segments 148, 150, upper and lower angled segments 152, 154 and a recessed panel segment 156.

Top overlap segment 140 of front sheet member 102 extends around the back side of upper rail 106 and overlaps top segment 124 of rear sheet member 104. Similarly, bottom overlap segment 142 of front sheet member 102 extends around the back side of lower rail 108 and overlaps bottom segment 126 of rear sheet member 104. These overlap segments 140, 142 restrict the horizontal motion of front sheet member 102 with respect to rear sheet member 104.

Top ship lap segment 144 contacts top surface 114 of upper rail 106 forming top wall 19 of section 100 and bottom ship lap segment 146 contacts bottom surface 116 of lower rail 108 forming bottom wall 21 of section 100. This configuration achieves the proper interface between adjacent panel sections 100 and restrains the vertical movement of joined framework 118 with respect to front sheet member 102.

Front skin 14 of panel section 100 is comprised of planar segments 148, 150, angled segments 152, 154 and recessed panel segment 156 of front sheet member 102. Planar segments 148, 150 in conjunction with overlap segments 140, 142 restrain horizontal movement of joined framework 118 with respect to front sheet member 102. Recessed panel segment 156 is a substantially planar segment which is recessed from planar segments 148, 150. Angled segments 152, 154 and recessed panel segment 156 provide additional strength to front skin 14 and an aesthetically pleasing recessed panel appearance.

Front sheet member 102 in combination with rear sheet member 104 and joined framework 118 defines a cavity 158 therebetween. Cavity 158 extends vertically continuously between the bottom surface 160 of upper rail 106 to the top surface 162 of lower rail 108. Cavity 158 also extends horizontally between inner surface 138 of front sheet member 102 and inner surface 122 of rear sheet member 104 in horizontal sections without hardware mounting members 110, and in channels 164 between hardware mounting members 110 and inner surface 138 in horizontal sections which include hardware mounting members 110.

Rigid foam core 112 is foamed-in-place and expands to fills cavity 158 defined by the assembled panel section. Rigid foam core 112 is an injected polyurethane foam comprising isocyanate and polyol reactive material. These two parts are expelled into cavity 158 by an expanding catalyst used as a blowing agent. The blowing agent is preferably HFC 141B. During this foaming process the foam core 112 bonds to front sheet member 102 and rear sheet member 104 with joined framework 118, achieving structural unity for panel section 100.

As previously stated, the chemical make-up of front sheet member 102 is chose to provide an effective bond to foam core 112, and thus to provide an effective structural unity of the entire panel section 100. Front sheet member 102 is primarily polyvinylchloride and includes other additives for stability, fusion and/or processing purposes. The volumetric ratio of the formula includes polyvinylchloride at 100 parts; processing aids e.g., an acrylic, at 0.3 to 1.2 parts to promote fusion; an impact acrylic modifier at 4.0 to 6 parts to add physical properties; an organotin stabilizer at 0.8 to 1.5 parts used as a thermal dehydrochlorinator stabilizer; a tree-flowing, dustless, calcium stearate at 0.9 to 2.0 parts to promote fusion; wax lubricants at 0.9 to 1.3 parts to reduce friction during the processing of the polyvinylchloride; a chalk resistant titanium dioxide at 10 to 15 parts for an ultraviolet stabilization system; and an ultrafine grade calcium carbonate 0.5 to 3 parts for reducing plate out in the extrusion process. A dye may also be added to the compound to create a sheet member having a desired color throughout.

A detailed chemical analysis of the bonding surfaces to determine specifically which of the above elements in the compound create the strong bond has not been performed. However, the specific chemical compound which is believed to provide the strongest bond is polyvinylchloride at 100 parts; processing aids e.g., an acrylic, at 0.5 parts; an impact acrylic modifier at 5.0 parts; an organotin stabilizer at 1.3 pans; calcium stearate at 1.25 parts; wax lubricants at 1.1 parts; a chalk resistant titanium dioxide at 10.0 parts; and an ultrafine grade calcium carbonate at 2.0 parts.

Many or all of the above ingredients may be generically available. In the preferred composition described above, the specific processing aid is manufactured by Rohm & Haas and is known as K-175. The specific impact modifier is also manufactured by Rohm & Haas and is known as KM334. The specific organotin stabilizer used is manufactured by AKZO and is known as T263-B. The wax lubricant used is a paraffin polyethylene wax manufactured by Reochem and is known as 315S. The chalk resistant titanium dioxide is manufactured by DuPont and is known as R-960.

This chemical compound provides a strong two dimensional chemical bond between front sheet member 102 and polyurethane foam core 112. As polyurethane foam core 112 has adhesive qualities, mechanical bonds are formed between front sheet member 102 and polyurethane foam core 112 and between rear sheet member 104 and polyurethane foam core 112. To enhance the mechanical bond to front sheet member 102, inner surface 138 of front sheet member 102 may be scored to increase the effective surface area. However, no intermediate adhesive layer is necessary to create the union between front sheet member 102 and polyurethane foam core 112.

When made from the aforementioned chemical compound and used with the disclosed polyurethane foam, front sheet member 102 is preferably at least 0.070 inches in thickness. This is necessary because a thickness of less than 0.070 inches tends to produce a front skin with an uneven surface.

To manufacture panel section 100 of the first preferred embodiment, first and second sheet members 102, 104 must be formed. First sheet member 102 is extruded from a quantity of the aforementioned compound and is post processed by calibrators to achieve the desired shape. Polyvinylchloride sheet member 102 is preferably scored at this point by a 400 grit sand surface to enhance the bond to foam core 112. Fiberglass second sheet member 104 is injected molded to achieve its planar shape.

While sheet members 102, 104 are being formed, horizontal rails 106, 108 and hardware mounting members 110 are cut and shaped to their desired size and configuration. Horizontal rails 106, 108 and hardware mounting members 110 are then aligned in a jig and the top and bottom of hardware mounting members 110 are affixed to upper and lower rails 106, 108, respectively, to form joined framework 118. The hardware mounting members 110 are preferably affixed to horizontal rails 106, 108 by zigzag staples, not shown.

While still in the jig, joined framework 118 is attached to inner surface 122 of rear sheet member 104. This is preferably done by applying a reactive hot melt adhesive to one or both of the contacting surfaces. However, in lieu of a reactive hot melt adhesives, other adhesives including epoxy can be used. Further, mechanical attachment devices including nails, staples or tacks can be used in addition to, or in lieu of the adhesives to promote the attachment.

Once joined framework 118 is attached to rear sheet member 104, front sheet member 102 is placed around rear sheet member 104 defining cavity 158 and forming a skeletal unit for panel section 100.

The skeletal unit is placed in a match-up fixture which duplicates the size, parameters and shape of the unit. The match-up fixture is open-ended on at least one side end allowing for the entry of an injection device. The match-up fixture may be open-ended on both ends permitting the entry of an additional injection device. One or more injection devices is inserted through the open-ended fixture and channels 164.

While the injection device is inside cavity 158, the polyurethane foam is injected with the blowing agent to fill the entire cavity 158. The injection device may be moved throughout the injection process to create a more even distribution of the polyurethane foam. The polyurethane foam is best injected while at a temperature in the range between 80°-90° F.

When polyurethane foam core 112 hardens, panel section 100 is removed from fixture and the product resembles the panel section shown in FIG. 8. At this point, both sides 22, 24 of panel section 100 may be sealed protecting polyurethane foam core 112 from the elements of nature. To seal the sides 22, 24, a hot melt adhesive is applied by an adhesive gun between side edges 128 and 130 and between side edges 132 and 134 of panel sheet members 104, 102. The hot melt adhesive cures in approximately 6 or 7 seconds and creates a moisture-proof coating for the polyurethane foam core 112 at the sides 22, 24 of panel section 100. Alternatively, sides 22, 24 may be sealed attaching plastic end caps thereto.

Figure 9:
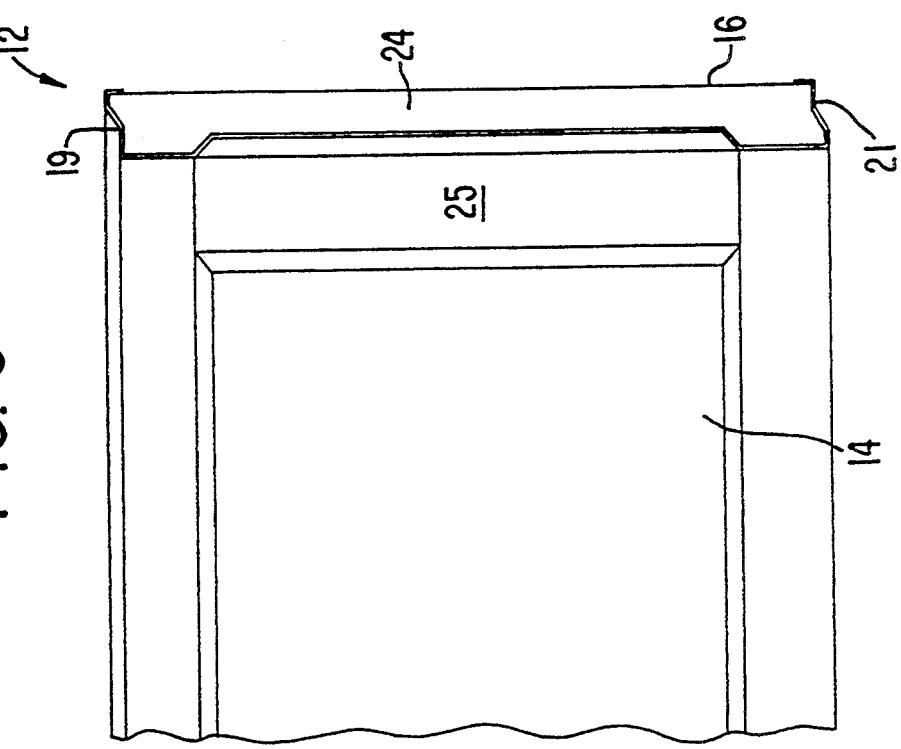
FIG. 9 is an isometric view of the right side of a completed panel section.

As shown in FIGS. 1 and 9, horizontally spaced, quadrilaterally shaped, hollow vertical insert members 25a, 25b, 25c are attached to outer surface 136 of front sheet member 102 which extend between upper and lower outer planar segments 148,150 to complete the aesthetically pleasing recessed panel appearance and to provide additional strength to panel section 12. Vertical insert members 25 are formed from extruded polyvinylchloride, preferably of the same compound used to form front sheet member 102, and may optionally be filled with polyurethane foam to provide additional strength. Vertical insert members 25 may be attached by hardware, e.g. screws, or an adhesive to front skin 14.

Gasket assemblies 30 and seal strips 52 are attached to predesignated panel sections 100. At this point, a number of panel sections 100 are ready to be shipped to an installation site along with the necessary hinge assemblies 26, brackets 28, rollers and tracks.

On site, the tracks are installed at the sides of a garage entry opening. The brackets 28, hinge assemblies 26 and rollers are conventionally attached to hardware mounting members 110 of each panel section 100, such that the rollers move within tracks and pivotally attach adjacent panel sections 100. An electric garage door opener may optionally be added. At this point, the assembly of garage door 10 is complete.

Figures 10, 11:
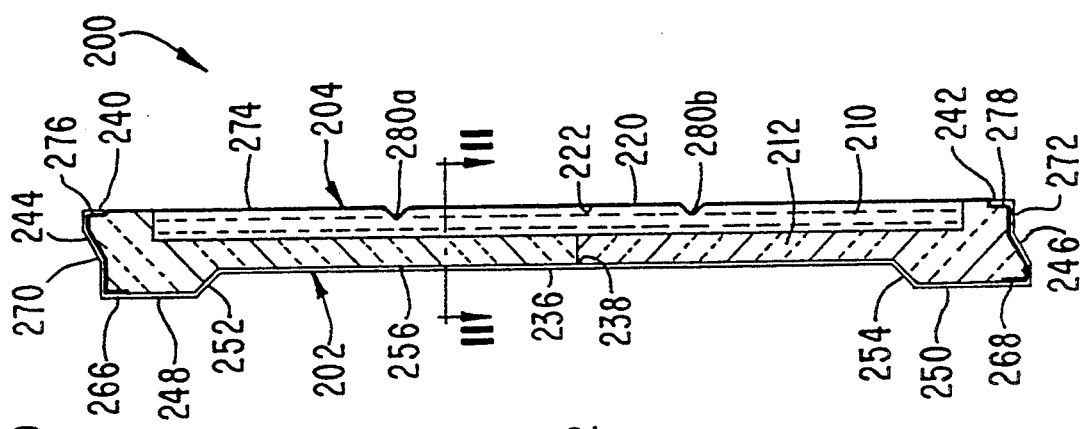
FIG. 10 is a side view of the second preferred embodiment of a panel section.
FIG. 11 is a cross-sectional view token along lines 11—11 of FIG. 10.

A second preferred embodiment of a panel section is shown in FIGS. 10 and 11 and is generally referred to by reference numeral 200. Panel section 200 includes front and rear sheet members 202,204, a plurality of hardware mounting members 210a, 210b, 210c and a foamed core 212.

Front sheet member 202 of the second preferred embodiment is essentially the same as front sheet member 102 of the first preferred embodiment having top and bottom overlap segments 240, 242, top and bottom ship lap segments 244, 246, upper and lower outer planar segments 248, 250, upper and lower angled segments 252, 254 and a recessed panel segment 256. Front sheet member 202 also includes outer and inner surfaces 236, 238 and left and fight side edges 232, 234.

While the second preferred embodiment does include horizontally spaced, vertical hardware mounting members 210, it does not include horizontal rails and thus cannot form a joined framework. The need for a joined framework is eliminated by the unique shape of rear sheet member 204 and its relationship to front sheet member 202.

Rear sheet member 204 of the second preferred embodiment differs from the first preferred embodiment in shape, material and function. Rear sheet member 204 and front sheet member 202 are shaped to interlock. As best shown by FIG. 11, rear sheet member 204 includes left and right side edges 228, 230 and outer and inner surfaces 220, 222, and is oriented such the inner surface 222 faces inner surface 238 of front sheet member 202. As best shown in FIG. 10, rear sheet member 204 also includes a top downturned segment 266, a bottom upturned segment 268, top and bottom ship lap segments 270, 272 and a vertical wall segment 274.

Vertical wall segment 274 of rear sheet member 204 includes a top recessed portion 276 providing a flush interface with top overlap segments 240 and top ship lap segment 244 of front sheet member 202 and to create a smooth transition between top overlap segment 240 of front sheet member 202 and vertical wall segment 274 of rear sheet member 204. Similarly, vertical wall segment 274 of rear sheet member 204 includes a bottom recessed portion 278 providing a flush interface with bottom overlap segment 242 and bottom ship lap segment 246 of front sheet member 202 and to create a smooth transition between bottom overlap segment 242 of front sheet member 202 and vertical wall segment 274 of rear sheet member 204.

Vertical wall segment 274 of rear sheet member 204 may also include indented horizontal strengthening ribs 280a, 280b for increasing its strength. If ribs 280 are used hardware mounting members 210 must be shaped accordingly to accommodate ribs 280. Although two ribs 280 are shown in FIG. 10, any number of ribs 280 may be used to provide the desired additional strength.

As shown in FIG. 10, an upper part of upper planar section 248, top ship lap segment 244 and top overlap segment 240 of front sheet member 202 respectively overlap top downturned segment 266, top ship lap segment 270 and top recessed portion 276 of rear sheet member 204 to provide the interlocking arrangement on the upper portion of panel section 200. Similarly, a lower part of lower planar section 250, bottom ship lap segment 246 and bottom overlap segment 242 of front sheet member 202 respectively overlap bottom upturned segment 268, bottom ship lap segment 272 and bottom recessed portion 278 of rear sheet member 204 to provide the interlocking arrangement on the lower portion of panel section 200. The overlapping arrangement of top ship lap segments 244, 270 and bottom ship lap segments 246, 272 produces doubled-layer top and bottom walls 19, 21 of panel section 200 over the entire length and width of the walls.

Front sheet member 202 in combination with rear sheet member 204 defines a cavity 258 therebetween. Cavity 258 extends vertically continuously between the double-layer top wall 19 of panel section 200 to the double-layer bottom wall 21 of panel section 200. Cavity 258 also extends horizontally between inner surface 238 of front sheet member 202 and inner surface 222 of rear sheet member 204 in horizontal sections without hardware mounting members 210, and in channels 264 between hardware mounting members 210 and inner surface 238 in horizontal sections which include hardware mounting members 210.

Both front and rear sheet members 202, 204 are preferably extruded polyvinylchloride sheets which are post processed through calibrators to achieve their desired cross-sectional shape as previously described and shown in FIG. 10.

The chemical compound used for the polyvinylchloride front and rear sheet members 202, 204 is chosen to provide an effective bond to foam core 212 and therefore is the same formula as described in conjunction with the front sheet member 102 of the first preferred embodiment. Using this chemical compound for both front and rear sheet members 202,204 produces a chemical and mechanical bond between the polyurethane core 212 and the inner surface 238, 222 of both sheet members 202, 204. Both polyvinylchloride sheet members 202, 204 are preferably scored by a 400 grit sand surface to enhance the bond to foam core 212.

As in the first preferred embodiment, the sheet members 202, 204 are preferably at least 0.070 inches in thickness to produce a panel section 200 with even surfaces.

The manufacturing of panel section 200 of the second preferred embodiment is similar to the manufacturing of panel section 100 of the first preferred embodiment. First and second sheet members 202, 204 are extruded from a quantity of the aforementioned chemical compound and are post processed by calibrators to achieve their respective desired shape. Sheet members 202,204 are preferably scored at this point by a 400 grit sand surface to enhance the bond to foam core 212.

While sheet members 202, 204 are being formed and shaped, hardware mounting members 210 are cut and shaped to their desired size and configuration and aligned in a jig. While still in the jig, hardware mounting members 210 are attached to inner surface 222 of rear sheet member 204. This is preferably done by applying a reactive hot melt adhesive to one or both of the contacting surfaces. However, in lieu of a reactive hot melt adhesives, other adhesives including epoxy can be used. Further, mechanical attachment devices including nails, staples or tacks can be used in addition to, or in lieu of the adhesives to promote the attachment.

Once hardware mounting members 210 are attached to rear sheet member 204, front sheet member 202 is placed around rear sheet member 204 defining cavity 258 and forming an enclosed unit for panel section 200.

The enclosed unit is placed in a match-up fixture which duplicates the size, parameters and shape of the unit. The match-up fixture is open-ended on at least one side end allowing for the entry of an injection device. Match-up fixture may be open-ended on both ends permitting the entry of an additional injection device. One or more devices are inserted through the open-ended fixture and channels 264.

While the injection device is inside cavity 258, the polyurethane foam is injected with the blowing agent to fill the entire cavity 258. Injection device may be moved throughout the injection process to create a more even distribution of polyurethane foam. The polyurethane foam is best injected while at a temperature in the range between 80°-90° F.

When polyurethane foam core 212 hardens, panel section 200 is removed from the fixture. At this point, sides 22, 24 of panel section 200 may be sealed protecting urethane foam core 2 12 from the elements of nature. To seal the sides 22, 24, a hot melt adhesive is applied by an adhesive gun to the sides 22, 24 of panel section 200. The hot melt adhesive cures in approximately 6 or 7 seconds and creates a moisture-proof coating. Alternatively, sides 22, 24 may be sealed by the attachment of plastic end caps thereto.

Horizontally spaced, vertical insert members 25a, 25b, 25c, gasket assemblies 30 and seal strips 52 are attached to panel sections 200 by the same methods disclosed with the first preferred embodiment. Panel sections 200 may also be shipped and installed in the same manned as described with the first preferred embodiment.

Regardless of which preferred panel section is used, a vinyl garage door of the present invention is structurally solid and will not split, crack, splinter, rot, warp, rust, erode, corrode or deteriorate.

Further, a garage door of the present invention is lighter than the present alternatives which makes it easier to install, creates less stress on connecting hinge assemblies and brackets, facilitates manual raising and lowering of the door and costs less money to raise and lower the door with an electric opener.

Additionally, a vinyl garage door of the present invention does not require continuous painting or staining because the panels of the present invention have a dye mixed into the chemical compound and therefor the skins are the desired color throughout.

The present method of manufacturing a garage door also provides the opportunity to easily manufacture custom sizes and looks by simply changing the post processing settings for the extruded sheet members.

While particular embodiments of the invention have been shown and described, it is recognized that various modifications thereof will occur to those skilled in the art. Therefore, the scope of the herein-described invention shall be limited solely by the claims appended hereto.

What is claimed is:

1. A rectangular door panel section having a front skin, a rear skin; opposing top and bottom portions, and first and second sides, said door panel section comprising:

a polyvinylchloride first sheet member having an outer surface, an inner surface, a top section and a bottom section, wherein said front skin of said door panel section being comprised essentially of said first sheet member;

a polyvinylchloride second sheet member having an outer surface, an inner surface, a top section and a bottom section, wherein said rear skin of said door panel section being comprised essentially of said second sheet member, and wherein said inner surface of said first sheet member faces said inner surface of said second sheet member; and a rigid foamed core enclosed between said front and rear skins for unitizing the panel section, said foamed core extending continuously from the top portion of the panel section to the bottom portion of the panel section, said foamed core being bonded to the inner surface of said first sheet member and to the inner surface of said second sheet member;

said rigid foamed core being a foamed-in-place polyurethane chemically bonded to the inner surface of the first sheet member and to the inner surface of the second sheet member for structurally unitizing the door panel section and eliminating the need for exterior reinforcing supports;

said door panel section having a rear exterior including the outer surface of said rear skin, said rear exterior of said door panel section being substantially void of reinforcing stiles.

2. The door panel section of claim 1, further comprising at least one hardware mounting member attached to the inner surface of said second sheet member for mounting hardware thereto for pivotally connecting the door panel section to an adjacent door panel section.

3. The door panel section of claim 2, wherein each hardware mounting member is affixed only to the inner surface of said second sheet member.

4. The door panel section of claim 1, wherein the thickness of the first sheet member is at least 0.070 inches.

5. The door panel section of claim 1, wherein the first side of the panel section includes a right side edge and the second side of the panel section includes a left side edge, and wherein the panel section further comprises an adhesive layer applied to the right and left side edges of the door panel section to seal the rigid foamed core from the environment.

6. The door panel section of claim 1, wherein the front skin of the door panel section includes a substantially planar recessed portion.

7. The door panel section of claim 1, wherein said door panel section includes top and bottom walls, said door panel section further comprising upper and lower horizontally extending rails adjacent the top and bottom walls of the door panel section, respectively.

8. The door panel section of claim 7, wherein the upper horizontally extending rail and the lower horizontally extending rail are attached to the second sheet member, and the top section of the first sheet member extends around the upper horizontally extending rail and overlaps the top section of the second sheet to form the top wall of the door panel section, and the bottom section of the first sheet member extends around the lower horizontally extending rail and overlaps the bottom section of the second sheet to form the bottom wall of the door panel section.

9. The door panel section of claim 1, wherein the top section of the first sheet member and the top section of the second sheet member interlock to form a top wall of the door panel section and the bottom section of the first sheet member and the bottom section of the second sheet member interlock to form a bottom wall of the door panel section.

10. The door panel section of claim 9, wherein the top section of one of the first and second sheet members overlaps the top section of the other one of the first and second sheet member to form a double-layered top wall for the door panel section over entire length and width of the top wall, and the bottom section of one of the first and second sheet the tubers overlaps the bottom section of the other one of the first and second sheet member to form a double-layered bottom wall for the door panel section over the entire length and width of the bottom wall.

11. The door panel section of claim 1, further comprising a plurality of vertical members attached to the outer surface of the first sheet member.

12. A rectangular door panel section having a front skin, a rear skin; opposing top and bottom portions, and first and second sides, said door panel section comprising:

a polyvinylchloride first sheet member having an outer surface, an inner surface, a top section and a bottom section, wherein said front skin of said door panel section being comprised essentially of said first sheet member;

a non-metallic second sheet member having an outer surface, an inner surface, a top section and a bottom section, wherein said rear skin of said door panel section being comprised essentially of said second sheet member, and wherein said inner surface of said first sheet member faces said inner surface of said second sheet member; and a rigid foamed core enclosed between said front and rear skins for unitizing the panel section, said foamed core extending continuously from the top portion of the panel section to the bottom portion of the panel section, said foamed core being bonded to the inner surface of said first sheet member and to the inner surface of said second sheet member;

wherein the polyvinylchloride first sheet member is comprised of material substantially at the following ratio:

polyvinylchloride at 100 parts;
processing aids at 0.3 to 1.2 parts;
impact modifier at 4.0 to 6 parts;
an organotin stabilizer at 0.8 to 1.5 parts;
calcium stearate at 0.9 to 2.0 parts;
lubricants in a quantity sufficient to reduce friction during the processing of the polyvinylchloride;
chalk resistant titanium dioxide 10 to 15 parts; and
ultrafine grade calcium carbonate 0.5 to 3 parts.

13. The door panel section of claim 12, wherein the lubricants comprise a paraffin wax at 0.9 to 1.3 parts per 100 parts of polyvinylchloride.

14. A sectional garage door comprising a plurality of pivotally connected rectangular door panel sections;
wherein each rectangular door panel section has a front skin, a rear skin, opposing top and bottom portions, and first and second sides, and wherein each door panel section comprising:
a polyvinylchloride first sheet member having an outer surface, an inner surface, a top section and a bottom section, wherein said front skin of said door panel section being comprised essentially of said first sheet member;
a polyvinylchloride second sheet member having an outer surface, an inner surface, a top section and a bottom section, wherein said rear skin of said door panel section being comprised essentially of said second sheet member, and wherein said inner surface of said first sheet member faces said inner surface of said second sheet member; and
a rigid foamed core enclosed between said front and rear skins for unitizing the panel section, said foamed core extending continuously from the top portion of the panel section to the bottom portion of the panel section, said foamed core being bonded to the inner surface of said first sheet member and to the inner surface of said second sheet member; said rigid foamed core being a foamed-in-place polyurethane chemically bonded to the inner surface of the first sheet member and to the inner surface of the second sheet member for structurally unitizing the door panel section and eliminating the need for exterior reinforcing supports; and
a rear exterior including the outer surface of said rear skin, said rear exterior being substantially void of reinforcing stiles.

* * * * *